United States Patent [19]

Carcia et al.

[11] Patent Number: 4,472,041
[45] Date of Patent: Sep. 18, 1984

[54] PHOTOGRAPHIC CAMERA WITH ELECTRONIC FLASH SNEAK CHARGE

[75] Inventors: Peter P. Carcia, Reading; Judith L. Neely, Watertown, both of Mass.

[73] Assignee: Polaroid Corporation, Cambridge, Mass.

[21] Appl. No.: 488,089

[22] Filed: Apr. 25, 1983

[51] Int. Cl.³ ............................................ G03B 15/03
[52] U.S. Cl. .................... 354/413; 354/418; 354/145.1; 354/173.11
[58] Field of Search ............... 354/413, 414, 418, 485, 354/145.1, 173.11

[56] References Cited

U.S. PATENT DOCUMENTS

| | | | |
|---|---|---|---|
| 3,415,644 | 12/1968 | Land | 96/3 |
| 3,478,660 | 11/1969 | Land | 95/11.5 |
| 3,846,812 | 11/1974 | Biber | 354/145 |
| 3,874,875 | 4/1975 | Land | 96/76 C |
| 3,942,183 | 3/1976 | Whiteside | 354/29 |
| 3,977,014 | 8/1976 | Norris | 354/196 |
| 4,023,187 | 5/1977 | Shenk | 354/27 |
| 4,040,072 | 8/1977 | Johnson et al. | 354/173 |
| 4,074,295 | 2/1978 | Kee | 354/145 |
| 4,188,103 | 2/1980 | Biber et al. | 354/27 |
| 4,231,645 | 11/1980 | Davis et al. | 354/145 |
| 4,239,361 | 12/1980 | Harvey | 354/145 |
| 4,315,676 | 2/1982 | LaRocque et al. | 354/27 |
| 4,348,087 | 9/1982 | Ellin et al. | 354/139 |
| 4,361,389 | 11/1982 | Monks et al. | 354/139 |
| 4,426,144 | 1/1984 | Kawazoe | 354/145.1 |

Primary Examiner—Russell E. Adams
Attorney, Agent, or Firm—Edward S. Roman

[57] ABSTRACT

A photographic camera system for use with film units of the self-developing type including control means for providing a sneak charge of the electronic flash between the exposure interval and the film transport interval in order to reduce the apparent flash charge time subsequent to the transport of the film unit from the camera even though the overall charge time for the electronic flash remains unchanged.

10 Claims, 1 Drawing Figure

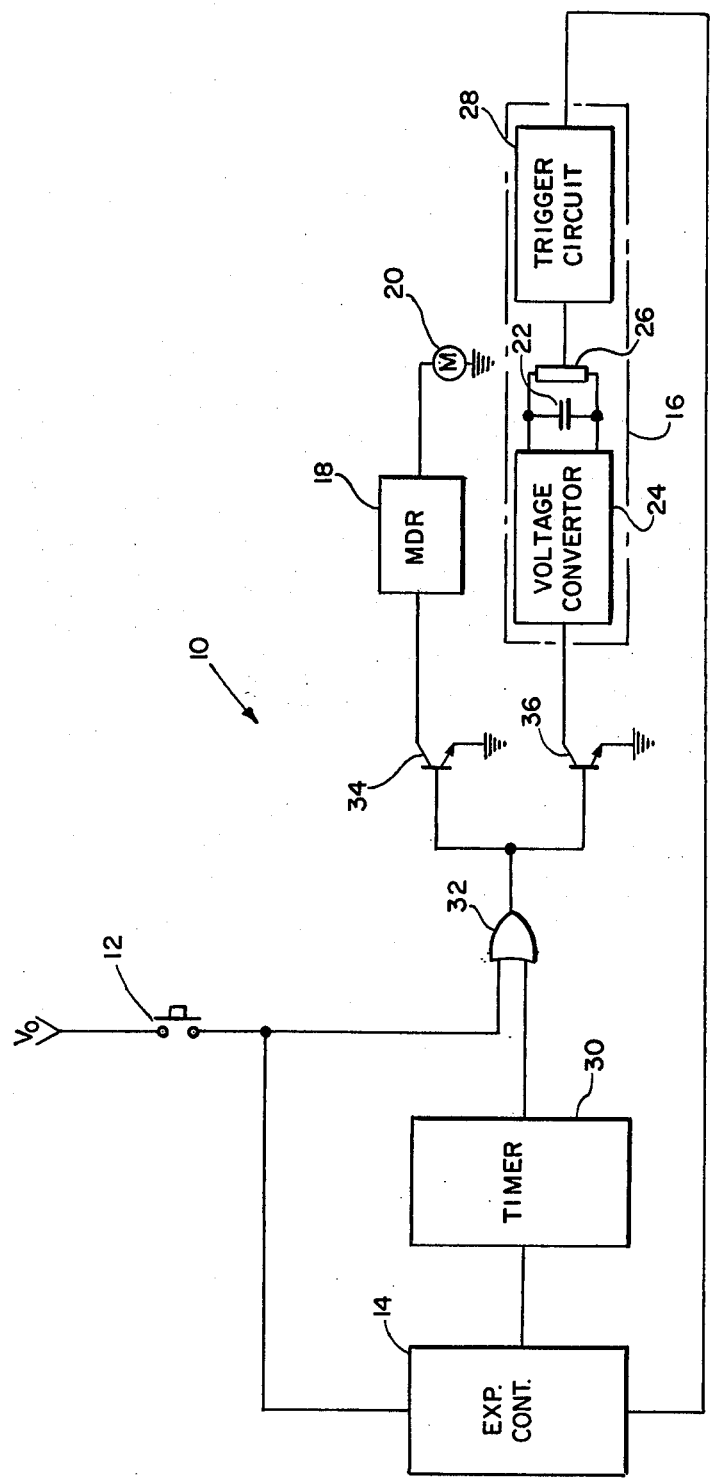

PHOTOGRAPHIC CAMERA WITH ELECTRONIC FLASH SNEAK CHARGE

BACKGROUND OF THE INVENTION

1. Field of the Invention

This invention relates to a photographic camera system with an electronic flash sneak charge and, more particularly, to a photographic camera system with an electronic flash for which the apparent charging time subsequent to an exposure cycle is reduced by a sneak charge.

2. Description of the Prior Art

Fully automatic cameras most recently sold by Polaroid Corporation, of Cambridge, Mass., U.S.A., are intended to be used with well-known instant developing film cassettes which include an integral power supply. The power supply forming an integral part of the cassette is a battery which supplies electrical energy for the operation of components of the camera in which the film units are exposed and processed. The cameras include various subsystems which, for instance, may be an exposure control system, a film transport system, a dark slide removal system, a motor powered mechanism for transporting and processing an exposed film unit, and electronic logic circuits that provide a sequence control of functions. In addition, it is highly desirable that such cameras be adapted for use with an electronic flash and that the electronic flash be powered from the film cassette battery as is described in U.S. Pat. No. 4,074,295, entitled "Compact Accessory Strobe for Cameras with Battery Enclosed Film Pack", by Richard C. Kee, issued Feb. 14, 1978, in common assignment herewith, or U.S. Pat. No. 4,231,645, entitled "Camera with Telescoping Dual Actuators", by Carl W. Davis et al., issued Nov. 4, 1980, in common assignment herewith. However, powering both the film transport motor as well as the electronic flash presents a high power drain to the battery which could potentially result in a battery failure prior to the exposure of all the film units in the film cassette. Such a battery failure would become likely if the user should turn on the flash and leave it to operate in a continuous charging mode over an extended period of time.

Thus, it has been recognized that the operation of the film transport motor and the charging of the electronic flash must be sequentially timed so as not to occur simultaneously as fully described in U.S. Pat. No. 3,846,812, entitled "Automatic Electronic Flash Camera", by Conrad H. Biber, issued Nov. 5, 1974, in common assignment herewith and now incorporated by reference herein. In the aforementioned camera, once the exposed film unit has been transported and ejected from the camera, the electronic flash is sequenced to charge in readiness for the next succeeding photographic exposure operation. Thus, a photographer perceives the termination of the first photographic exposure cycle when the exposed film unit is ejected from the camera whereupon he must thereafter wait for the electronic flash to become fully charged before implementing the next succeeding photographic exposure cycle. Since the photographer readily perceives the ejection of the exposed film unit as the final act in the exposure cycle, the subsequent time required to charge the electronic flash before the next succeeding photographic exposure cycle can be initiated is readily apparent to him and may appear to be exceedingly long even if in fact it is only a matter of seconds, particularly if the photographer is anxious to implement the next succeeding photographic exposure cycle. However, as previously discussed, the charging of the electronic flash cannot be accomplished during the operation of the film transport motor because of an excessive drain upon the film cassette battery.

Therefore, it is a primary object of this invention to provide a photographic camera system wherein the apparent charging time for an electronic flash subsequent to the ejection and transfer of an exposed film unit from the camera is shortened by a predetermined charge interval sneaked in prior to the operation of the film transport motor.

Other objects of the invention will in part be obvious and will in part appear hereinafter. The invention accordingly comprises the mechanism and system possessing the construction, the combination of elements and the arrangement of parts which are exemplified in the following detailed disclosure.

SUMMARY OF THE INVENTION

In a photographic camera system for use with film units of the self-developing type wherein the camera system includes an exposure control system for controlling the exposure interval, motor driven film transport means for automatically transporting exposed film units from the camera system subsequent to exposure and an electronic flash for providing artificial illumination during the exposure interval there is provided an improved control means for enabling the electronic flash to operate in a charging mode for a predetermined interval immediately subsequent to the exposure interval while simultaneously disabling the film transport motor from operating. Subsequent to the predetermined time interval the control means of this invention operates to disable the electronic flash from operating in its charging mode while simultaneously enabling the film transport motor to operate to transport the exposed film unit from the camera so as to provide a sneak charge during the predetermined interval in order to reduce the apparent charge time subsequent to the film unit being transported from the camera system without reducing the overall charge time required. The camera system may additionally include a manually actuatable photographic exposure initiation switch connected so that the actuation thereof operates to enable the exposure control system to commence an exposure interval. The aforementioned control means includes means responsive to the manual actuation of the photographic exposure initiation switch subsequent to the exposure interval for enabling the electronic flash to operate in its charging mode for the duration of the time that the photographic exposure initiation switch remains actuated while simultaneously disabling the film transport motor from operating.

DESCRIPTION OF THE DRAWING

The novel features that are considered characteristic of the invention are set forth with particularity in the appended claims. The invention itself, however, both as to its organization and its method of operation, together with other objects and advantages thereof, will be best understood from the following description of the illustrated embodiment when read in connection with the accompanying drawing wherein:

The drawing is a block diagram for the photographic camera system of this invention.

DESCRIPTION OF THE PREFERRED EMBODIMENT

Referring now to the drawing there is shown at 10 a block diagram for a photographic camera system embodying the features of this invention. A photographic exposure cycle may be commenced in the usual manner by manually closing a photographic exposure initiation switch 12 so as to connect a power supply from the terminal $V_0$ to an exposure control as shown generally at 14. The exposure control 14 may be of any well-known type such as those embodying scanning shutter blade elements which operate to vary exposure aperture areas with time during the exposure interval as taught by U.S. Pat. No. 3,942,183, entitled "Camera with Pivoting Blades", by George D. Whiteside, issued Mar. 2, 1976, in common assignment herewith and now incorporated by reference herein. Such scanning shutter blade mechanisms generally include a pair of counter-reciprocating shutter blade elements each having a primary aperture that traverses the optical axis of the camera during the exposure interval. The primary apertures are shaped so that upon overlying one another during countermovement of the blades, there is defined an effective exposure aperture value which increases to a maximum value in a determinate period of time.

Exposure control is provided in a well-known manner by a pair of secondary photocell apertures in respective shutter blade elements which admit scene light to a photoresponsive element in correspondence with the scene light admitted to the focal plane during shutter blade movement through an exposure cycle. The output from the photoresponsive element is directed to an integrator circuit which triggers upon reaching an integration level corresponding to a desired exposure value to terminate the exposure interval by returning the shutter blade elements back to their initial scene light blocking position as fully described in U.S. Pat. No. 3,942,183, supra.

The exposure control 14 also includes an objective lens assembly or arrangement which may be either of the fixed or variable focus type for focusing image forming light rays in a well-known manner at the focal plane in the camera.

The exposure control 14 is also arranged to operate in synchronism with an electronic flash as shown generally at 16 in any conventional manner. In one such embodiment the shutter blade mechanism of the exposure control 14 and the electronic flash 16 are arranged to operate in either a high ambient scene light intensity mode of operation where no artificial illumination is provided or a low ambient scene light intensity mode of operation where the electronic flash is fired to provide a source of artificial illumination. Under conditions of low ambient scene light intensity where the electronic flash 16 is expected to be fired, the scanning shutter blade mechanism of the exposure control 14 may be stopped at an aperture value corresponding to the camera-to-subject distance as determined by focusing the objective lens. Systems of the aforementioned type are generally referred to as "follow-focus" systems and the maximum aperture to which the scanning shutter blade elements are allowed to open is controlled by a rangefinding or focusing system of the camera in a manner as is fully disclosed in U.S. Pat. No. 3,977,014, entitled "Follow-Focus Exposure Control System with Improved Uniform Trim Control", by Philip R. Norris, issued Aug. 24, 1976, in common assignment herewith and now incorporated by reference herein.

In another alternative embodiment, the exposure control 14 need not operate to actually stop the opening shutter blade movement at a maximum effective exposure aperture as determined by the rangefinding or focusing system of the camera 10, but may instead vary the time at which the flash light is fired during the opening shutter blade movement as determined in correspondence with the rangefinding or focusing system of the camera 10. Since the duration of the flash light is short in comparison to the time required for the shutter blade mechanism to scan from its scene light blocking position to its maximum exposure aperture defining position, the aperture defined by the shutter blade elements at the instant of electronic flash firing for practical purposes constitutes the effective aperture by which the exposure occurs. Such a system is more fully described in U.S. Pat. No. 3,478,660, entitled "Photographic Apparatus with Flash Exposure Control System", by Edwin H. Land, issued Nov. 18, 1969, in common assignment herewith and now incorporated by reference herein. This range responsive flash fire system can also be utilized in conjunction with a sonar rangefinding device as is more fully described in U.S. Pat. No. 4,188,103, entitled "Range Synchronized Flash Photographic Apparatus and Method for Achieving Optimum Exposure", by Conrad H. Biber et al., issued Feb. 12, 1980, in common assignment herewith and now incorporated by reference herein.

Exposure control 14 may alternatively be of a type which provides artificial illumination to fill in the photographic subjects against a brightly backlit scene as is more fully disclosed in U.S. Pat. No. 4,023,187, entitled "Exposure Control System with Fill Flash Race Condition", by Edwin K. Shenk, issued May 10, 1977, in common assignment herewith and now incorporated by reference herein. In this embodiment the exposure control 14 operates under conditions of low ambient scene light intensity to fire the electronic flash 16 at a predetermined time period subsequent to the initiation of the exposure interval. Under conditions of high ambient scene light intensity the exposure control 14 operates to fire the electronic flash 16 as a consequence of the time integration of the scene light intensity incident to the photoresponsive element reaching a predetermined value. In still another alternative arrangement, exposure control 14 may be of a type which provides sonar rangefinder controlled focusing and flash firing in a manner as is more fully described in U.S. Pat. No. 4,315,676, entitled "Camera with Autoranging Focusing and Flash Fire Control", by Arthur G. LaRocque et al., issued Feb. 16, 1982, in common assignment herewith and now incorporated by reference herein.

Referring more specifically now to the electronic flash 16 it can be seen to comprise a main storage capacitor 22 which may be charged up to an operating voltage by a conventional voltage converter circuit as shown generally at 24. The voltage converter 24 operates in a conventional manner to convert a DC voltage as may be derived from the power supply connected to the terminal $V_0$ which may be in the order of 6 volts to a suitable flash operating voltage such as 350 volts. A flashtube 26 is connected in parallel relation with respect to the storage capacitor 22 and may be ignited by a trigger circuit 28 of any conventional form which is set in operation by the closing of conventional synchronous contacts of the exposure control 14 in the usual manner. As will be readily understood, the electronic flash 16 may be formed as an integral part of the camera system 10 or, alternatively, may be made as a detachable accessory, if so desired.

The photographic system 10 is designed for use with film units of the self-developing type similar to that described in U.S. Pat. No. 3,415,644, issued to Edwin H. Land on Dec. 10, 1968, in common assignment herewith and now incorporated by reference herein. The film units are packaged in well-known instant developing film cassettes similar to that disclosed in U.S. Pat. No. 3,874,875, issued to Edwin H. Land on Apr. 1, 1975, in common assignment herewith and now incorporated by reference herein. These well-known instant developing cassettes include an integral power supply which connects to the $V_0$ power terminal in a well-known manner. The power supply which forms an integral part of the cassette is preferably a 6 volt battery which supplies electrical energy for the operation of the exposure control 14, electronic flash 16 and a film transport motor 20 for transporting an exposed film unit in a well-known manner as more fully described in U.S. Pat. No. 4,040,072, entitled "Shutter Latch Arrangement Releasable Through Shutter Blade Actuation and Resettable Through Film Advancement", by Bruce K. Johnson et al., issued Aug. 2, 1977, in common assignment herewith and now incorporated by reference herein. The motor 20 is controlled by a motor drive circuit 18 which receives an enabling input signal from the collector terminal of an NPN transistor 34. The voltage converter 24 of the electronic flash 16 is also enabled in like manner by an input signal received from the collector terminal of another NPN transistor 36 having a base terminal connected in common with the base terminal of the transistor 34. The transistors 34 and 36 receive output base control signals simultaneously from an OR gate 32. One input terminal of the OR gate 32 connects directly to the power supply terminal $V_0$ by way of the exposure initiation switch 12, and the other input terminal to the OR gate 32 connects to the output of a timer 30 which preferably comprises a monostable multivibrator triggered in the manner of this invention from an output signal from the exposure control 14 upon the termination of the exposure interval.

Since the camera system 10 is powered from a single 6 volt battery manufactured as an integral part of the film cassette in the aforementioned manner, there would be presented a high power drain to the battery which could potentially result in battery failure prior to the exposure of all the film units in the film cassette if the film transport motor 20 is driven at the same time the voltage converter 24 is turned on to charge the main storage capacitor 22. This difficulty was recognized in U.S. Pat. No. 3,846,812, supra, which provided for a controlled sequence in which subsequent to the termination of the exposure interval the film transport motor was operated to eject the film unit while the electronic flash was prohibited from charging until the film unit was completely ejected. Thus, the film transport and electronic flash charging operations occurred sequentially and not simultaneously in order to conserve the energy of the film cassette battery.

The photographic camera system of this invention, however, while also operating not to simultaneously energize the film transport motor 20 during the time that the voltage converter 24 operates to charge the storage capacitor 22, additionally provides for a sneak charge interval during which the storage capacitor 22 is partially charged prior to the operation of the film transport motor 20 so as to reduce the apparent strobe charge time subsequent to when the film unit is finally ejected from the camera without changing the overall charge time required to charge the electronic flash 16. The sneak charge of this invention for the electronic flash 16 which effectively reduces the apparent charge time subsequent to the ejection of the film unit is provided in the following manner.

Subsequent to the termination of the exposure interval as implemented in the aforementioned manner by the exposure control 14, there is provided in a well-known manner a trigger signal to the timer 30. The timer 30 which as previously discussed preferably comprises a monostable multivibrator, in turn, responds to the trigger signal from the exposure control 14 by providing an affirmative (binary logic 1) signal level for a predetermined time interval, i.e., timing pulse, so as to switch the output from the OR gate 32 to an affirmative (binary logic 1) signal level and thereby drive the transistors 34 and 36 into saturation. Turning on the transistors 34 and 36 in this manner disables the motor drive control circuit 18 from energizing the film transport motor 20 while simultaneously enabling the voltage converter 24 to charge the capacitor 22 for the duration of the pulse provided by the timer 30.

The timing pulse provided by the timer 30 may be in the order of 1 second thereby enabling the voltage converter 24 to sneak in a 1 second charge cycle prior to the operation of the film transport motor 20. Subsequent to the expiration of the timing pulse from the timer 30, the affirmative (binary logic 1) signal level changes to a low (binary logic 0) signal level so as to switch the output from the OR gate 32 to a low (binary logic 0) signal level and thereby turn off transistors 34 and 36. This, in turn, disables the voltage converter 24 from further charging the storage capacitor 22 while simultaneously enabling the motor drive circuit 18 to energize the motor 20 and thereby transport the exposed film unit through the processing rolls from the camera. The exposure control 14 may thereafter operate in the usual manner to provide the appropriate control signals to the motor drive circuit 18 so as to deenergize the film transport motor 20 upon the complete ejection of a film unit and simultaneously enable the voltage converter 24 to again charge the storage capacitor 22 in a manner as is fully described in U.S. Pat. No. 3,846,812, supra.

Should the photographer continue to manually actuate the photographic exposure initiation switch 12 subsequent to the expiration of the exposure interval, there will be provided an affirmative (binary logic 1) signal level to the OR gate 32 so as to turn on the transistors 34 and 36 regardless of the state of the output signal from the timer 30. Thus, the photographer by not releasing the exposure initiation switch 12 can delay the energization of the film transport motor 20 while simultaneously extending the electronic flash charge time particularly in situations where the noise from the film transport motor 20 may be socially undesirable. As is readily apparent, should the photographer release the exposure initiation switch 12 subsequent to the expiration of the predetermined timing pulse provided by the timer 30, then the output signal from the OR gate 32 will switch to a low (binary logic 0) signal level to turn off the transistors 34 and 36 so as to enable the motor drive control circuit 18 to energize the transport motor 20 while simultaneously disabling the voltage converter 24 from further charging the storage capacitor 22.

As will be readily understood the electronic flash 16 may be of the regulated type and may also be utilized in a camera system of a type as described in U.S. Pat. No. 4,348,087, entitled "Photographic System for Automatic Recharging Electronic Flash", by Seymour Ellin, issued Sept. 7, 1982, in common assignment herewith and now incorporated by reference herein. Therefore, the electronic flash 16 may be charged subsequent to the transport of the exposed film unit from the camera to a full charge condition after which the converter 24 is turned off until the photographer initiates a subsequent exposure cycle. Thus, in this manner there is provided a sneak charge between the exposure interval and the film transport interval which operates to reduce the apparent charge time subsequent to transport of the exposed film unit from the camera even though the overall flash charge time remains unchanged. Since the photographer only perceives the flash charge time subsequent to the transport of the exposed film unit from the camera, the sense provided is one of a substantially shortened charge time for the electronic flash 16.

Since certain changes may be made in the above-described system and apparatus without departing from the scope of the invention herein involved, it is intended that all matter contained in the description thereof or shown in the accompanying drawing be interpreted as illustrative and not in a limiting sense.

What is claimed is:

1. In a photographic camera system for use with film units of the self-developing type wherein the camera system includes an exposure control system for controlling an exposure interval, motor driven film transport means for automatically transporting exposed film units from the camera system subsequent to exposure and an electronic flash for providing artificial illumination during the exposure interval, the improvement comprising: control means for enabling the electronic flash to operate in a charging mode for a predetermined time interval immediately subsequent to the exposure interval while simultaneously disabling the film transport motor from operating, and for thereafter disabling the electronic flash from operating in its charging mode while simultaneously enabling the film transport motor to operate to transport an exposed film unit from the camera so as to provide a sneak charge during said predetermined interval in order to reduce the apparent charge time subsequent to the film unit being transported from the camera system, without changing the overall charge time required to charge the electronic flash.

2. The improvement of claim 1 wherein the camera system is of the type including a manually actuatable photographic exposure initiation switch connected such that the actuation thereof operates to enable the exposure control system to commence an exposure interval and said control means includes means responsive to the manual actuation of the photographic exposure initiation switch subsequent to the exposure interval for enabling the electronic flash to operate in its charging mode for the duration of the time that the photographic exposure initiation switch remains actuated while simultaneously disabling the film transport motor from operating.

3. The improvement of claim 2 wherein said control means responds to the manual deactuation of the photographic exposure initiation switch subsequent to the expiration of said predetermined time interval to disable the electronic flash from operating in its charging mode while simultaneously enabling the film transport motor to operate to transport the exposed film unit from the camera apparatus.

4. The improvement of claim 3 wherein said predetermined time interval is less than the time required during said charging mode for the electronic flash to reach a select charge condition from a substantially zero charge condition.

5. The improvement of claim 4 wherein said control means comprises a monostable multivibrator circuit responsive to the conclusion of the exposure interval for providing an affirmative logic signal for said predetermined time interval and logic gate means responsive either to said affirmative logic signal from said multivibrator or the manual actuation of said photographic exposure initiation switch for providing said enabling signal to the electronic flash while simultaneously providing said disabling signal to the film transport motor.

6. A photographic camera system for use with film units of the self-developing type comprises:
    exposure control means for controlling the exposure of each film unit during an exposure interval;
    film transport means including a film transport motor for automatically transporting exposed film units from the camera system subsequent to exposure;
    an electronic flash for providing artificial illumination during the exposure interval; and
    control means for enabling said electronic flash to operate in a charging mode for a predetermined time interval immediately subsequent to said exposure interval while simultaneously disabling said film transport motor from operating, and for thereafter disabling said electronic flash from operating in its said charging mode while simultaneously enabling said film transport motor to operate to transport an exposed film unit from said camera apparatus, so as to provide a sneak charge during said predetermined interval in order to reduce the apparent charge time subsequent to the film unit being transported from the camera system without changing the overall charge time required to charge the electronic flash.

7. The camera system of claim 6 including a manually actuatable photographic exposure initiation switch connected such that the actuation thereof operates to enable the exposure control system to commence an exposure interval and wherein said control means includes means responsive to the manual actuation of said photographic exposure initiation switch subsequent to said exposure interval for enabling said electronic flash to operate in its said charging mode for the duration of the time that said photographic exposure initiation switch remains actuated while simultaneously disabling said film transport motor from operating.

8. The camera system of claim 7 wherein said control means responds to the manual deactuation of said photographic exposure initiation switch subsequent to the expiration of said predetermined time interval to disable said electronic flash from operating in its said charging mode while simultaneously enabling said film transport motor to operate to transport the exposure film unit from the camera apparatus.

9. The camera apparatus of claim 8 wherein said predetermined time interval is less than the time required during said charging mode for said electronic flash to reach a select charge condition from a substantially zero charge condition.

10. The camera system of claim 9 wherein said control means comprises a monostable multivibrator circuit responsive to the conclusion of the exposure interval for providing an affirmative logic signal for said predetermined time interval and logic gate means responsive either to said affirmative logic signal from said multivibrator or the manual actuation of said photographic exposure initiation switch for providing said enabling signal to said electronic flash while simultaneously providing said disabling signal to said film transport motor.

* * * * *